(12) United States Patent
Das

(10) Patent No.: US 11,758,527 B2
(45) Date of Patent: Sep. 12, 2023

(54) GENERALIZED CONTENT-AWARE SPECTRUM ALLOCATION SYSTEM

(71) Applicant: Federated Wireless, Inc., Arlington, VA (US)

(72) Inventor: Deepak Das, Lexington, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

(21) Appl. No.: 15/855,531

(22) Filed: Dec. 27, 2017

(65) Prior Publication Data

US 2018/0184430 A1    Jun. 28, 2018

Related U.S. Application Data

(60) Provisional application No. 62/439,461, filed on Dec. 27, 2016.

(51) Int. Cl.

| | |
|---|---|
| *H04W 72/0453* | (2023.01) |
| *H04L 41/5019* | (2022.01) |
| *H04L 43/16* | (2022.01) |
| *H04L 43/08* | (2022.01) |
| *H04L 67/10* | (2022.01) |
| *G06N 20/00* | (2019.01) |
| *G06N 3/045* | (2023.01) |

(52) U.S. Cl.
CPC ..... *H04W 72/0453* (2013.01); *H04L 41/5019* (2013.01); *H04L 43/08* (2013.01); *H04L 43/16* (2013.01); *G06N 3/045* (2023.01); *G06N 20/00* (2019.01); *H04L 67/10* (2013.01)

(58) Field of Classification Search
CPC ........... H04W 72/0453; H04W 72/044; H04W 72/04; H04L 43/08; H04L 43/00; H04L 43/16; H04L 41/5019; H04L 41/50; H04L 41/00; H04L 67/10; H04L 67/00
USPC .......................................................... 370/329
See application file for complete search history.

(56) References Cited

U.S. PATENT DOCUMENTS

2006/0083205 A1* 4/2006 Buddhikot ............ H04W 28/16
370/338
2009/0298522 A1* 12/2009 Chaudhri .............. H04W 16/14
455/509

(Continued)

*Primary Examiner* — Jeffrey M Rutkowski
*Assistant Examiner* — Luna Weissberger
(74) *Attorney, Agent, or Firm* — Finnegan, Henderson, Farabow, Garrett & Dunner, LLP

(57) ABSTRACT

The disclosed embodiments provide improved methods and systems for managing spectrum by intelligently allocating specific channels from a pool of available spectrum channels used to serve content. For example, one or more sources may send "content service requests" over a network to request the delivery of content, which may be any type or amount of data. In accordance with the disclosed embodiments, a spectrum management service (SMS) receives a content service request for delivery of a content over a wireless access network, and it allocates spectrum for serving the requested content in the wireless access network based on at least one radio-frequency criterion and at least one criterion relating to the content. Further to the disclosed embodiments, the SMS issues a message to a transmission center in the wireless access network indicating the allocated spectrum that may be used to serve the content in the wireless access network.

19 Claims, 5 Drawing Sheets

(56) References Cited

U.S. PATENT DOCUMENTS

| | | | |
|---|---|---|---|
| 2010/0309806 A1* | 12/2010 | Wu | H04L 67/104 370/252 |
| 2011/0250915 A1* | 10/2011 | Stanforth | H04W 16/14 455/509 |
| 2012/0014332 A1* | 1/2012 | Smith | H04W 16/14 370/329 |
| 2012/0071189 A1* | 3/2012 | Mody | H04L 27/0006 455/513 |
| 2013/0142154 A1* | 6/2013 | Gorokhov | H04L 5/0007 370/329 |
| 2013/0295948 A1* | 11/2013 | Ye | H04W 16/14 455/452.1 |
| 2015/0334643 A1* | 11/2015 | Maaref | H04W 48/18 370/329 |
| 2016/0095016 A1* | 3/2016 | El-Refaey | H04W 72/0453 370/329 |
| 2016/0255205 A1* | 9/2016 | Russell | G06Q 50/188 455/406 |
| 2017/0215079 A1* | 7/2017 | Fortman | H04L 5/003 |
| 2017/0272956 A1* | 9/2017 | Gu | H04W 16/10 |
| 2017/0295109 A1* | 10/2017 | Byers | H04Q 1/00 |
| 2017/0295409 A1* | 10/2017 | Simon | H04N 21/2383 |
| 2018/0213407 A1* | 7/2018 | Miao | H04W 16/14 |

* cited by examiner

| | 300 |
|---|---|
| REQUEST ID | <AUTOMATICALLY GENERATED> |
| REQUEST TYPE | <BROADCAST STREAMING, BROADCAST NRT DATA, BROADBAND STREAMING, ETC.> |
| REQUEST DEADLINE | <TIME BY WHICH TIME REQUEST MUST BE SERVED – COULD BE ABSOLUTE, COULD BE DELTA FROM TIME OF ENTRY, OTHER> |
| ASSOCIATED SLA IDENTIFIER | <ENTER ANY SLA THIS REQUESTER IS TIED TO, IF ANY> |
| REQUEST PRIORITY | <OPTIONAL, IF NOT SPECIFIED BY SLA> |
| REQUEST SIZE | <WHERE APPLICABLE> |
| REQUEST VALUE | <CAN BE USED TO DETERMINE PRIORITY AS IN AN "AUCTION" MECHANISM> |
| NRT DATA SERVICE | <SPECIFY HOW THIS DATA NEEDS TO BE SERVED> |
| CONTENT TYPE | <QUALIFICATION OF THE CONTENT SUCH AS ADs ETC.> |
| CONTENT COVERAGE | < LOCAL, NATIONAL, ETC.> |

*FIG. 3*

| | 400 |
|---|---|
| RESOURCE ID | <AUTOMATICALLY GENERATED> |
| RESOURCE OWNER | <OWNER ID> |
| RESOURCE TYPE | <BROADCAST CHANNEL, BROADBAND CHANNEL, BOTH> |
| RESOURCE BANDWIDTH | <6 MHZ> |
| RESOURCE AVAILABILITY START | <SPECIFY TIME> |
| RESOURCE AVAILABILITY END | <SPECIFY TIME> |
| RESOURCE QUALITY | <CATEGORIZATION SUCH AS CLASS 1, CLASS 2, ETC.> |
| RESOURCE COVERAGE | <LOCAL, NATIONAL, ETC.> |

*FIG. 4*

| SLA ID | <AUTOMATICALLY GENERATED> |
|---|---|
| RESOURCE OWNER | <OWNER ID> |
| REQUEST OWNER | <CUSTOMER ID> |
| SERVICE PRIORITY | <VALUE> |
| SLA START | <DATA> |
| SLA END | <DATA> |
| OTHER SLA PARAMETERS | |
| | |

*FIG. 5*

GENERALIZED CONTENT-AWARE SPECTRUM ALLOCATION SYSTEM

RELATED APPLICATIONS

This application claims the benefit of U.S. Provisional Application No. 62/439,461, filed Dec. 27, 2016, entitled "A Generalized Content-Aware Spectrum Allocation System," which is hereby incorporated by reference in its entirety.

TECHNICAL FIELD

The disclosed embodiments generally relate to spectrum allocation and, more particularly, to systems and methods for allocating spectrum to deliver content in a wireless access network based, at least in part, on the content being delivered.

BACKGROUND

The radio frequency (RF) spectrum is the foundation for many wireless communications systems in use today, including radar and cellular communications systems. Specified frequency ranges, sometimes identified as bands or channels, in the RF spectrum may be allocated for use by different entities, for different purposes, or in different geographic locations. As used in this disclosure, "spectrum" generally refers to any frequencies, frequency bands, and frequency channels in the RF spectrum that may be used or allocated for wireless communications. In this disclosure, a frequency or spectrum "channel" refers to a particular range of frequencies, and a "block" may contain multiple channels or other spectrum ranges. A "spectrum resource" generally refers to spectrum, for example in units of frequency channels or blocks, that may be owned or licensed by a spectrum owner.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party gets one or more frequency assignments, in the form of a license, to operate a radio transmitter on specific frequencies within a particular geographic location.

The system of spectrum allocation, allotment, and assignment is generally failing to keep pace with the increasing demand for spectrum. There is therefore a need to improve how the available spectrum can be efficiently allocated, allotted, and assigned in the face of growing demand. Unless otherwise noted, "allocation" is used in the present disclosure to generally refer to the process by which spectrum is allocated, allotted, and/or assigned.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the 3.5 GHz band recently made available for commercial use in the United States. In another example, a DSA system may be used to share access to an unlicensed spectrum, such as TV Whitespace. The SAS may employ a Spectrum Management Service (SMS) for dynamically allocating available spectrum to one or more transmitters in a wireless access network. A transmitter, such as a base station, server, or other network node, may request spectrum allocation from the SAS so it may use the allocated spectrum to deliver content in a wireless access coverage area, e.g., which may be a wireless network or part of a larger network. As used herein, "data" refers to any information that may be transmitted in a network, and "content" refers to the substance of any data transmission or larger data transmission of which it is a part. Data and content transmitted from a transmitter to a receiver is said to be "delivered" from the transmitter to the receiver or equivalently "served" by the transmitter. The transmitter may use spectrum allocated by the SAS to serve any type or amount of content to users in the wireless access coverage area.

Shared spectrum is a paradigm that has been gaining traction as a way to significantly lower the cost of delivering internet access and meet the ever-growing need for data bandwidth. Given the enormous investment required to operate in a licensed spectrum, including the cost of procuring such licenses, shared-spectrum implementations typically do not allocate this valuable resource in the most efficient or flexible manner. Today, for example, spectrum is predominantly allocated for data transmission in a static way—i.e., data is sent over a fixed spectrum, which can be licensed or unlicensed, but does not dynamically change. Increasingly, there is a need to more flexibly use spectrum in a dynamic way. This could be due to many reasons such as, for example, the spectrum being shared between multiple owners or licensees, multiple owners or licensees collectively pooling their spectrum resources for the purpose of data transmissions, various business relationships and agreements used to determine how spectrum may be used for data transmissions, appropriateness of the spectrum for data transmissions, etc.

Where a SAS allocates spectrum dynamically, the SAS typically determines which spectrum to allocate based on RF-related metrics and criteria. For example, the SAS may obtain measurements of RF-related metrics, such as received signal strength indicators or other signal quality indicators, to determine RF-signal characteristics in a wireless access coverage area. Then, the SAS may allocate spectrum to one or more transmitters in that coverage area based on an evaluation of RF-signal propagation criteria, such as the radio propagation environment, and/or interference levels, to optimize the transmitters' use of the spectrum. By allocating spectrum based on RF-related criteria, the SAS also may attempt to optimize the Quality of Service (QoS) of data transmissions in the wireless access coverage area, for example, to optimize transmission data rates and bandwidths, signal-to-noise ratios, and/or bit error rates.

However, extant methods of shared spectrum allocation generally do not account for more comprehensive criteria associated with data transmissions. For example, only using RF criteria to optimize QoS may produce suboptimal results where there may be further business-related constraints, such as service level agreements (SLA) or other contractual agreements, defining acceptable levels of service for certain data transmissions.

SUMMARY

The disclosed embodiments provide improved methods and systems for managing spectrum by intelligently allocating specific channels from a pool of available spectrum channels used to serve content. For example, one or more sources may send "content service requests" over a network to request the delivery of content, which may be any type or amount of data. In accordance with the disclosed embodiments, a spectrum management service (SMS) receives a content service request for delivery of a content over a wireless access network, and it allocates spectrum for serving the requested content in the wireless access network based on at least one radio-frequency criterion and at least one criterion relating to the content. Further to the disclosed embodiments, the SMS issues a message to a transmission center in the wireless access network indicating the allocated spectrum that may be used to serve the content in the wireless access network.

In some disclosed embodiments, the SMS allocates spectrum for serving a requested content in the wireless access network not only based on an evaluation of at least one RF-related criterion, such as based on RF-signal propagation and/or acceptable interference levels, but also based on the nature of the content being requested, such as based on a type of content being requested, a QoS with which the requested content needs to be served, revenue generated for owners of spectrum and/or infrastructure resources used to serve the requested content, immediacy for delivering the requested content, and compliance with a SLA requirement (s). The SMS, for example, may utilize one or more RF characteristics of the available channels as well as information about the particular content to be delivered in determining which spectrum to allocate to the content. Thus, unlike prior systems, the SMS in the disclosed embodiments may combine RF-related criteria with "content aware" criteria when allocating spectrum for different content. Further to the disclosed embodiments, the SMS may allocate spectrum in terms of available channels or blocks appropriate to the transmission system, and may allocate spectrum from a "pool" of spectrum resources comprising contiguous and/or non-contiguous channels or blocks, or combinations thereof. The SMS may be deployed as a general cloud-based service that can be configured for different types of wireless access networks and content delivery.

Because the SMS in the disclosed embodiments is content aware, it may provide better overall value to owners of spectrum resources in the spectrum pool managed by the SMS than simply allocating spectrum based on RF-related criteria alone. For example, advantages of the disclosed methods and systems may include, without limitation, more efficient network utilization; improved average QoS per user, improved QoS for premium users, such as higher-priority corporate or government clients; improved QoS for public-safety clients during local, regional, and national emergencies.

The disclosed embodiments also may be advantageous where the content service requests have different revenue-generating potentials and/or user-experience expectations. In such cases, the SMS in the disclosed embodiments may allocate spectrum in a manner that optimizes one or a combination of content-related metrics comprised of, but not limited to, the nature of the content being served, the QoS with which the content needs to be served, revenue generated for owners of resources used to deliver the requested content (e.g., spectrum resources, infrastructure resources, etc.), immediacy for delivering the requested content (for example, emergency related services), minimization of failures in meeting SLA requirements, etc., in addition to optimizing one or more RF-related metrics.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 3 is an example of a content service request that may be input to a spectrum management service in accordance with the illustrative embodiments described herein.

FIG. 4 is an example of a resource availability that may be input to a spectrum management service in accordance with the illustrative embodiments described herein.

FIG. 5 is an example of a service level agreement between a resource-request owner and an owner of the resource that may be input to a spectrum management service in accordance with the illustrative embodiments described herein.

DETAILED DESCRIPTION

Figure 1:
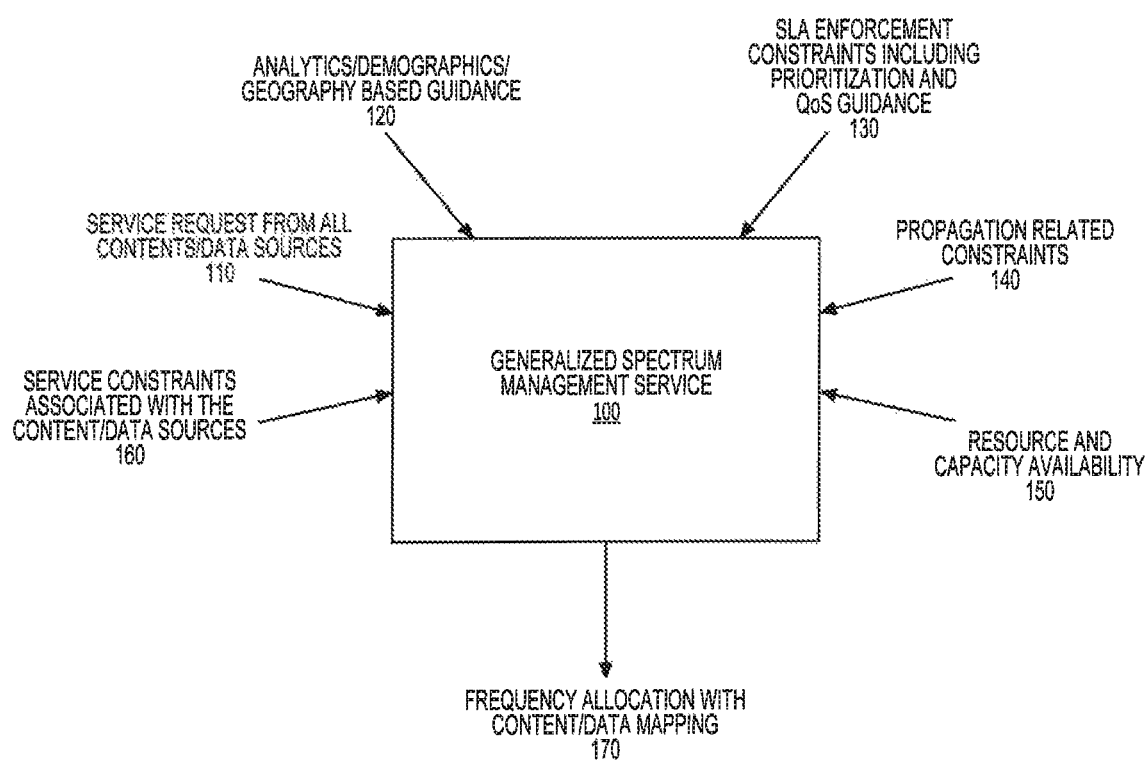
FIG. 1 is a schematic diagram of possible inputs to an exemplary spectrum management service in accordance with the illustrative embodiments described herein.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The disclosed embodiments provide a SMS that allocates spectrum in the form of frequency channels and/or blocks to optimize for the content that is being delivered on those frequencies. Unlike extant implementations, the disclosed embodiments map data transmissions dynamically to spectrum channels to meet different objectives in an efficient way. Accordingly, the disclosed embodiments may provide a more holistic approach to spectrum allocation and sharing, one that may account different criteria, including both RF-related criteria and content-aware criteria. Examples of such criteria may include, but are not limited to:

Criteria related to service requests from one or more content/data sources—both on the downlink (network to end-users) and uplink (end-users to network);

Delivery and performance constraints that service requests need to satisfy;

Guidance criteria on how data or content needs to be served from different sources, including, for example, insights from analytics, knowledge of demographics of consumers of such content/data, and other inputs based on different kinds of statistics;

SLAs between stake-holders, such as frequency spectrum owners, content/data providers, and, in some embodiments, even end-users, which may impact prioritization, QoS in terms of bandwidth, delay-sensitivity, etc., applicable to the content/data being served;

Channel characteristics including propagation characteristics, channel loading and congestion when the channel is shared between users, and other aspects that affect coverage and capacity;

Available capacity of the underlying network to support such services ("capacity" may be used generally such that it may account for flexibilities available with the underlying network); and Constraints relevant to the particular service being served by the network, such as, for example, whether the network is handling an emergency service that temporarily limits its abilities to serve other classes of content/data.

In the disclosed embodiments, a wireless access network may include the SMS in communication with one or more sources and transmission centers. A source generally may be any entity (e.g., network node, end user, resource owner of spectrum or infrastructure, etc.) that requests spectrum to be allocated for delivering a content in the network and/or provides information the SMS may use to allocate spectrum for the content. In some embodiments, one or more transmissions centers, which may be part of a network of transmission centers, may be used to serve the content over at least a portion of the spectrum allocated by the SMS. In the disclosed embodiments, a source may request that the SMS allocate spectrum for delivering a particular content in accordance with a service. The source may comprise, for example, a base station, eNodeB, or an access point that requests spectrum from the SMS to deliver content to another network node or user equipment within a wireless access coverage area. The source may additionally, or alternatively, provide information that the SMS may use to manage and/or allocate spectrum in the network. A service may comprise, for example, any contractual, software, or other service arrangement in which data is provided to a network node and/or end user. The disclosed embodiments herein are exemplary and are not intended to limit the embodiments of the present disclosure to any particular types of sources, services, or content.

FIG. 1 illustrates possible inputs to an exemplary SMS 100 that may be used in accordance with the disclosed embodiments. In some embodiments, the SMS may be implemented in a SAS. Additionally or alternatively, the SMS may be implemented in a network node separate from an SAS and/or may be distributed across multiple SASs and/or other network nodes, such as in a cloud-based architecture. As used herein, a network node may be any entity configured to communicate in the wireless access network.

In some embodiments, the SMS, for example, may be implemented by specialized software running on one or more processors of a computer, whether special-purpose or general-purpose. For example, the SMS may be embodied in software stored in one or more memories in a computer or that are otherwise accessible to the computer, for example, in any computer-readable storage medium accessible over a local bus, external bus, or network connection. In some embodiments, a computer with SMS 100 may include at least one network interface over which the computer may communicate with one or more sources and/or transmission centers in a wireless access network, such as, but not limited to, any cellular, Wi-Fi, or other wireless access network. For example, the computer may be configured to communicate over at least one network interface with one or more transmission centers that may be configured to transmit content using spectrum allocated by the SMS. Additionally, or alternatively, at least one of the transmission centers may be located at the "edge" of the network, i.e., in communication with other network nodes or RF transmitters configured to transmit content. The transmission centers may be the same or different network nodes as the one or more sources.

In the exemplary embodiment of FIG. 1, SMS 100 is a centralized entity that provides spectrum management and allocation in a wireless network. The SMS may accept input obtained from multiple sources and provide guidance to a network of transmission centers in terms of how requested content may be served using available spectrum. In some embodiments, the transmission centers may include, for example, servers that provide content in a content delivery network and/or may be base stations, gateways, or other network nodes located at an edge of the wireless network in communication with such content-delivery servers.

FIG. 1 shows different exemplary inputs 110-160 that SMS 100 may receive from one or more sources in accordance with the disclosed embodiments. As used herein, a "content service request" generally refers to any request for the delivery of content in the network, which may be a request for any type or amount of data. The SMS may receive, for example, content service requests 110 from one or more content/data sources in the network. A content service request 110 may be generated by a source in the network or may be generated by any other requesting entity that uses the source to indirectly forward the request to the SMS. In some embodiments, the content service requests may be the primary inputs that the SMS uses to determine which spectrum to allocate to requested content. For example, content providers wanting to send content over spectrum managed by the SMS may issue content service requests, sent either directly or indirectly to the SMS, and their requested content may be served over frequency channels or blocks of channels that the SMS deems appropriate, e.g., based upon all or some of the inputs 120-160 and the SMS's spectrum allocation algorithm(s).

SMS 100 also may receive inputs 120 including analytics-based guidance from one or more sources. For example, analytics insights may indicate how desirable certain content is to an end user and therefore provide a relative prioritization for delivering the content. These insights may, for example, be based upon how time-critical the content is, what kind of QoS is required for delivering the content, or the revenue potential of the content. Such analytics-based factors associated with particular content may affect the prioritization and quality of delivering the content.

Further, SMS 100 may receive other analytics-based inputs 120, including, for example, demographics-based guidance. Demographics guidance may provide information to SMS 100 regarding an intended audience for certain content. Demographics guidance may, for example, allow the SMS to potentially determine what class(es) of user devices is (are) likely to consume the content. For example, if the demographics for particular content is dominated by users that use stationary devices capable of generally mid- to low-resolution capabilities, then demographics input 120 may be used in making spectrum-allocation decisions that serve that demographic's needs, without over-allocating channel resources.

In FIG. 1, the exemplary inputs 120 also may include geography or location based guidance. Geography, for example, may affect the QoS that can be supported for over-the-air transmissions (thereby affecting content delivery) in different geographic areas. More specific location information, for example, also may play a role in determining other aspects of content delivery (such as appropriateness), timing for content delivery, etc., which may be used by the SMS's spectrum allocation algorithm(s).

SMS 100 also may receive exemplary inputs 130 including SLA enforcement criteria and/or QoS guidance. For example, certain SLAs in place between the owner of content and the users consuming the content may govern terms of the quality of delivery (e.g., QoS), timeliness of delivery, etc. Similarly, SLAs between the content owner and the transmission infrastructure owner may, for example, dictate that the latter has to guarantee certain quality criteria for delivery of content belonging to the former. The inputs 130 may comprise at least one SLA enforcement constraint for a service in the wireless access network.

Other exemplary inputs 140 may include propagation-related constraints. Terrain and topography, for example, may influence the transmission of radio waves in the wireless access network. In one example, terrain and topography may affect how RF signals may be attenuated or blocked along different propagation paths. SMS 100 may receive information 140 pertaining to RF-propagation characteristics, and may use this information to determine implied effects on RF transmissions to intelligently decide what portions of the available spectrum may be allocated to different content. Moreover, SMS 100 may identify delivery requirements based on RF characteristics. In some embodiments, the propagation related constraints 140 may include UHF/VHF propagation constraints that are pertinent to a Broadcast Network use case.

SMS 100 also may receive the exemplary inputs 150 indicating resource and capacity availability. This input may capture information about infrastructure resources available at any point, directly or indirectly impacting the capacity of the access network deployed on the shared spectrum. Accordingly such information may be used as an input for allocating spectrum to content.

Other exemplary inputs 160 may include service constraints associated with the content/data sources. Service constraints may relate to specific requirements of the service that the content is associated with. For example, if the content is associated with an emergency or public safety service, there may be constraints that have to be taken into account when allocating spectrum resources for content used with such a service.

As noted above, SMS 100 may use one or more of the exemplary inputs 110-160 to allocate frequency channels and/or blocks of available spectrum for different content transmitted over a wireless access network. In some embodiments, SMS 100 may determine a mapping 170 of available frequency channels and/or blocks that may be used to transmit content served in the network. The mapping may be, for example, communicated in one or more messages sent to the transmission centers configured to serve the content in the network. The SMS may allocate spectrum for delivering content in the network, for example, to maximize channel capacity and, thus, the bandwidth utilization in allocated channels. The SMS 100 may also associate available frequency channels (or blocks) with the requested content or with a received content service request that requested transmission of the content.

Figure 2:
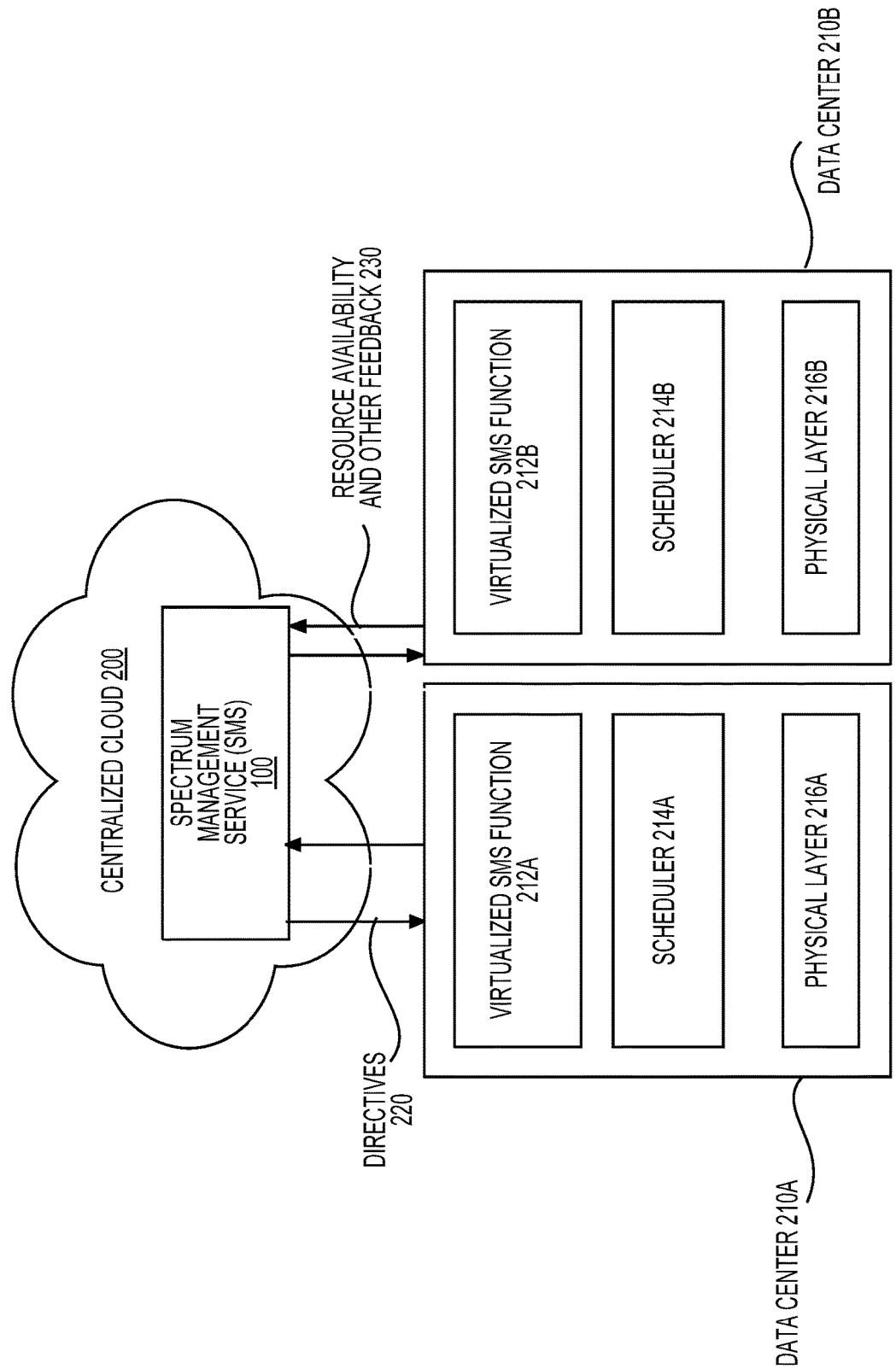
FIG. 2 is a schematic diagram of an exemplary architecture including a spectrum management service in accordance with the illustrative embodiments described herein.

FIG. 2 shows an exemplary high-level architecture that may include an SMS 100 in accordance with the disclosed embodiments. In this example, the network nodes marked as Data Centers 210a and 210b may be responsible for a number of functions that ultimately decide which content is transmitted over the spectrum allocated by the SMS. As used herein, the Data Centers 210a and 210b may be interchangeably referred to as "transmission centers." Although the example of FIG. 2 includes two Data Centers, other embodiments may include a single Data Center or three or more Data Centers.

As shown in FIG. 2, SMS 100 may be implemented on one or more computers in a centralized cloud system 200. Persons of ordinary skill will understand that, in such an exemplary embodiment, the Data Centers (e.g., 210a and 210b) and other network nodes and user equipment may communicate with SMS 100 using cloud-based messages and protocols, such as Web Service messages transmitted using REST, SOAP, JSON, or any other suitable protocols.

In the exemplary embodiment of FIG. 2, SMS 100 communicates (through appropriate hardware and software interfaces) its content-to-spectrum mapping directives 220 to a remote SMS "agent" shown as a Virtualized SMS function 212a hosted in a Data Center 210a (and function 212b hosted in a Data Center 210b). The directives may associate one or more frequency channels (or blocks) with a requested content and/or content service request. The directives also may indicate, for example, at least one of a capacity allocation, QoS, delay budgets, etc., to be used for delivering a content over one or more allocated channels or blocks. In some embodiments, the virtualized SMS function 212a (and similarly, function 212b) may provide information 230 to the SMS regarding the Data Center 210a's (and similarly, Data Center's 210b's) local spectrum resource availability and/or usage and other feedback information that may be used as an input to a spectrum allocation algorithm. In some embodiments, at least some of the SMS intelligence may be moved into the virtualized SMS function or into other functionality in the Data Center, e.g., closer to the edge of the network as opposed to in the centralized cloud, and thus closer to the point of RF transmissions.

The Virtualized SMS function 212a (and similarly, function 212b) may translate the received directive into a format that a Scheduler function 214a (and similarly, function 214b) can understand. In alternative embodiments, the Virtualized SMS function 212a (and similarly, function 212b) may be optional if the Scheduler function 214a (and similarly, function 214b) can directly understand the directives from SMS 100. The Scheduler function 214a (and similarly, function 214b) may manage the Physical Layer resources 216a (and correspondingly, resources 216b), such as choosing an appropriate air-interface modulation and/or coding, in order to meet the SMS's guidance in the directives. Accordingly, the Virtualized SMS function 212a (and similarly, function 212b) in this embodiment may be thought of as an SMS "agent" that translates the directives from the SMS 100 in the cloud (e.g., "control-plane" functions) to commands that the "data-plane" represented by the Scheduler 214a and Physical Layer 216a (and correspondingly, Scheduler 214b and Physical Layer 216b) can follow. In some embodiments, the Scheduler may map content streams to Physical Layer resources as per the SMS's guidance and based on local spectrum availabilities.

To decide which content or content service request to serve using which available spectrum, the SMS 100 may take into account various RF-based and content-based criteria, including but not limited to: priorities associated with the content (e.g., emergency-related content may be treated with pre-emptive weight or priority level so it can be served right away, whereas non-emergency content may be associated with a weight or priority level that is proportional to its priority class, etc.); delay budgets associated the content (e.g., some content may be meaningless if not served within a prescribed time window); guaranteed throughput associated with the content (e.g., some content may require a prescribed minimum data-rate when being served); analytics-based criteria that includes demographics information to identify which transmission networks need to serve what content at what time; fairness criteria (where relevant) such that the spectrum is equitably available to contending service requests; and the like. In some embodiments, the criteria may use RF-based and/or content-based metrics to determine if they satisfy predetermined relationships, such as, for example, having certain values, being within acceptable ranges of values, or exceeding (or being below) one or more threshold values. The metrics may correspond to any of the exemplary inputs 110-160 or other inputs obtained by the SMS.

SMS 100 may be configured to issue directives, for example in one or more messages, that prescribe certain actions that should be performed by one or more functions in a Data Center 210a (or similarly, Data Center 210b), e.g., by the Scheduler function 214a (or correspondingly, function 214b) or by a Medium-Access-Control (MAC) function (not shown in FIG. 2) or a MAC scheduler function (also not shown in FIG. 2). In some embodiments, SMS 100 may allocate spectrum for transmitting requested content and also instruct at least one function in a Data Center to perform one or more of the following actions:

1) serve this content at this time over these spectrum channels for this period of time;
2) serve this content in a pre-emptive manner in place of an on-going transmission over certain spectrum channels;
3) serve this content no later than a specified time;
4) serve this content opportunistically with a target average bit-rate;
5) serve this content with a guaranteed bit-rate whenever possible;
6) serve this content in a fair manner within its class of service requests;
7) serve this content in a first-come-first-serve basis within its class of service requests;
8) serve this content with a caching option that enables caching the content at the network "edge," e.g., at data centers closer to the point of radio transmission, for expedient transmission when required.

In one embodiment, for example, the SMS's guidance to the Scheduler may leverage Software-defined Networking (SDN) concepts in which the SMS 100 represents a centralized "control-plane" controller, and the SMS communicates content-to-spectrum mapping ("control") commands to a SMS "agent" 212a (or similarly, "agent" 212b), which, in turn, translates the "control" commands into "data-plane" commands for processing by the MAC and Physical Layers. In this disclosed embodiment, the SMS may send one or more messages to the SMS "agent" 212a or 212b indicating at least one content-to-spectrum mapping.

The following examples further demonstrate illustrative embodiments of the SMS's functionality. In these examples, spectrum allocation may be related to a broadcasting domain, e.g., the SMS's spectrum-allocation function is serving the needs of broadcasters who have "pooled" the spectrum that they own or licensed and are using the SMS's functionality to map content to their pool of spectrum.

Example 1—Monetizing Additional Capacity

In a first example, the SMS may be responsible for "dynamic" scheduling of content service requests across multiple frequency channels to monetize additional channel capacity. In this example, the SMS may manage three different frequency channels 1, 2, and 3 that are available in a pool. In this example, at the current time, the SMS may have scheduled content 1 to be transmitted on channel 1 and content 2 on channel 2. If the SMS receives a new content request (e.g., content 3) that exceeds what can be served by the capacity of available channel 3. In this example, the SMS may decide, without sacrificing SLAs, to split content 3 such that channel 1 may carry content 1 and a part of content 3, and channel 2 may carry content 2 and part of content 3, and channel 3 may carry the remaining portion of content 3. Thus, by "carouseling" content across multiple channels in compliance with the SLAs in this example, the SMS may generate revenue previously unavailable from the available channel 3.

Example 2—Creating Excess Capacity and Generating Revenue for Broadcasters Based on SLA Criteria In a second example, the SMS may be responsible for "dynamic" scheduling of spectrum resources to accommodate additional revenue opportunities in compliance with SLAs. In this example, the SMS may have already scheduled service of existing content based on content service requests received in the past, and the SMS may receive a content service request from an additional content source. The SMS may evaluate the revenue potential in serving the new content and also may determine whether to sacrifice the quality of delivery (e.g., QoS) of transmissions for existing content within the requirements of any relevant SLA(s). If permitted by the SLA(s), the SMS may allocate spectrum for serving the new content and also make modifications to spectrum allocations for existing content in order to create excess spectrum capacity that may allow serving the new content when the revenue to be made from serving the new content exceeds a specified threshold. In this example, the SMS may make this determination based on inputs relating to one or more SLA enforcement constraints and/or other content-delivery policy criteria, as well as RF-based criteria. If the revenue potential does not exceed the threshold, the SMS may determine that the predicted quality degradation imposed on existing scheduled content transmissions that would result from creating excess capacity for the new content is not economically valuable, and may decline to allocate spectrum for the new content service request at that time.

Examples 1 and 2 above are simple use cases that may employ a SMS 100 in accordance with certain disclosed embodiments. In more complex scenarios, the SMS may have to make spectrum-allocation decisions to serve content based on a more complex set of inputs. Moreover, SMS 100 may employ machine-learning techniques (e.g., one or more classifier networks, one or more neural networks, or the like) to dynamically learn better algorithms for optimizing bandwidth, revenue, or the like. Such machine-learning techniques may incorporate feedback received from, e.g., Data Centers 210a and 210b.

FIG. 3 shows an exemplary content service request 300 that may be received by SMS 100 in accordance with certain disclosed embodiments. In FIG. 3, the service request 300 may include various fields, including by way of example and not limitation, fields for: a request ID (e.g., a unique ID for the request), a request type (e.g., broadcast streaming, broadcast non-real time (NRT) data, broadband streaming, etc.), a request deadline (such as an absolute deadline, a deadline measured from a time of request, or the like, optionally including a range), an identifier of one or more associated SLAs (e.g., governing the SMS and the requestor, governing the particular content, or the like), a request priority, a request size, a request value (e.g., used in an allocation auction or used as in Example 2 above), an NRT data service, a content type, a content coverage (e.g., specifying a geographic area, expected recipients and/or demographics thereof, etc.), or the like.

FIG. 4 shows an exemplary resource-availability message 400 that may be received by SMS 100 in accordance with certain disclosed embodiments. For example, the resource-availability message 400 (e.g., resource and capacity availability 150 in FIG. 1 and resource availability 230 in FIG. 2) may be sent to the SMS, for example, by one or more Data Centers 210 transmitting content using the spectrum managed by the SMS. In FIG. 4, the resource-availability message 400 may include various fields, including by way of example and not limitation, fields for: a resource ID (e.g., a unique ID for the resource), a resource owner (e.g., a unique ID of the owner), a resource type (e.g., broadcast channel, broadband channel, or the like), a resource bandwidth (e.g., measured in MHz), a resource availability start and end time, a resource quality (e.g., Class 1, Class 2, or the like), a resource coverage (e.g., a geographic area, a group of expected recipients and/or demographics thereof, etc.), or the like.

FIG. 5 shows an exemplary SLA message 500 that may be input 130 to SMS 100 in accordance with certain disclosed embodiments. In the example of FIG. 5, the SLA governs the relationship between a resource owner and a requester. In other examples, the SLA may govern the relationship between particular content and a resource owner (e.g., an owner of spectrum or infrastructure), between a requester (or particular content) and one or more end users. In FIG. 5, the SLA message 500 may include various fields, including by way of example and not limitation, fields for: a SLA ID (e.g., a unique ID for the SLA), a resource owner (e.g., a unique ID of the owner), a request owner (e.g., a unique ID of the requester), a service priority (e.g., a priority for the requester, different priorities for different content from the requester, etc.), an SLA start and end time, or the like. Those skilled in the art will appreciate that each of the exemplary messages 300, 400, and 500 may include additional fields (not shown) or fewer than all of the illustrated fields consistent with the disclosed embodiments.

Figure 6:
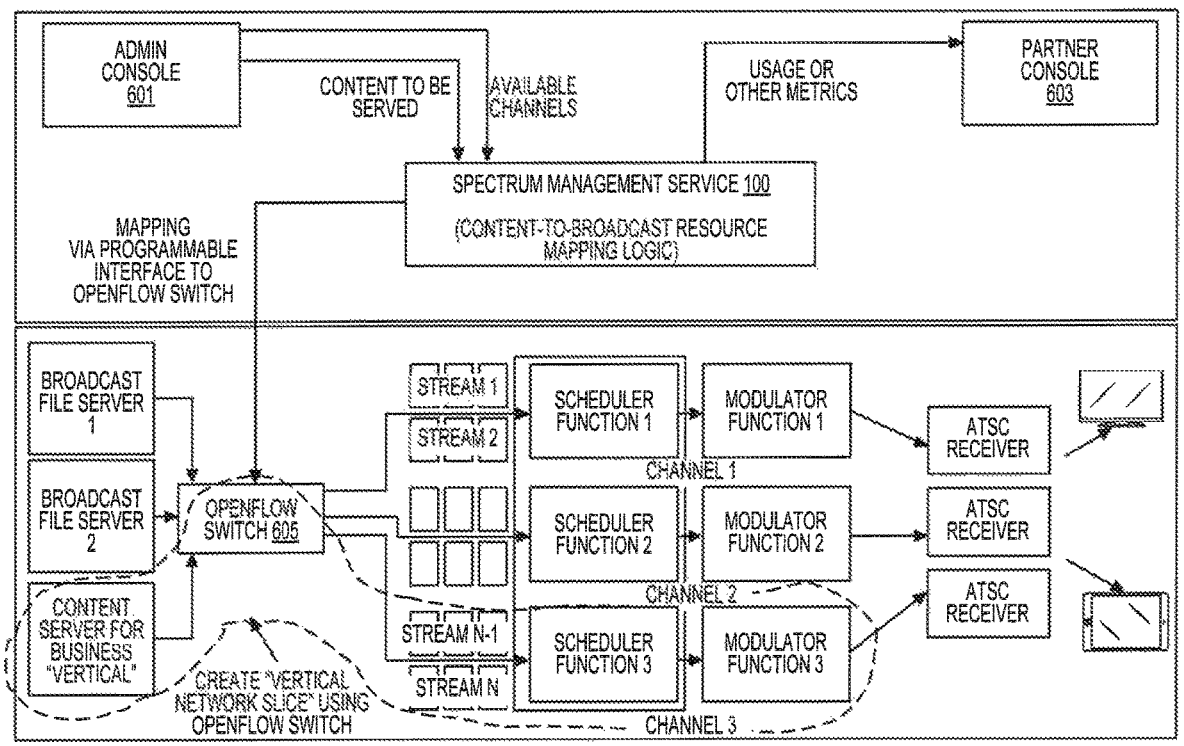
FIG. 6 is an exemplary block diagram depicting how a spectrum management service may provide content-to-spectrum mapping functionality in accordance with certain illustrative embodiments described herein.

FIG. 6 depicts a schematic block diagram showing an exemplary embodiment in which SMS 100 may provide content-to-spectrum mapping functionality in accordance with certain disclosed embodiments. In the example of FIG. 6, an Admin Console 601 (which may be text-based or GUI-based) may be used to forward, or facilitate the forwarding of, content service requests, such as exemplary request 300, from sources and requesters to SMS 100. In some embodiments, Admin Console 601 also may be used to forward, or facilitate the forwarding of, resource and capability availability messages, such as exemplary message 400, from Data Centers and other sources to SMS 100. In FIG. 6, SMS 100 may communicate usage or other metrics to a partner console 603 (which may be text-based or GUI-based). Owners of the spectrum managed by SMS 100 may receive metrics from partner console 603 and use such metrics in decision-making regarding changes to the spectrum and/or to SMS 100.

In the disclosed embodiments, SMS 100 may send one or more messages indicating content-to-spectrum mappings and/or other directives (such as for scheduling content delivery), for example, to indicate which spectrum resources may be used by transmission centers to serve content requested in a content-service request. For example, in a broadcasting domain (e.g., in a wireless access network used to transmit broadcasted content), SMS 100 may include content-to-broadcast-resource mapping logic to allocate available spectrum resources for delivering content requested in a content-service request received by the SMS.

In the exemplary implementation in FIG. 6, SMS 100 sends messages with content-to-spectrum mappings and other directives to a transmission center that may comprise, for example, a network switch (e.g., Openflow switch 605) that is coupled to a content server (e.g., a broadcast file server or a content server for a business) and one or more first-in first-out stream buffers that provide content data to a scheduler function and a modulator function. In this example, the content server, network switch, stream buffer (s), scheduler function, and modulator function may correspond to a transmission center, which creates a "vertical network slice" across various infrastructure components in the wireless access network. For example, a transmission center may be implemented using the "Channel 3" components within the dotted area in FIG. 6. In this exemplary embodiment, the Openflow switch 605 may be used to coordinate which file server(s), stream buffer(s), scheduler function, and/or modulator function should be used to serve requested content. Those skilled in the art will appreciate the exemplary transmission-center components in FIG. 6 may be implemented in hardware and/or software, and one or more of the exemplary components may be combined in a single computer system or may be distributed across a plurality of computer systems.

Further, although the SMS 100 in FIG. 6 sends its determined content-to-spectrum mappings and/or other directives to an exemplary Openflow switch 605 in the wireless access network, SMS 100 additionally or alternatively may send its determined mappings to a plurality of switches, each associated with a transmission center. More generally, the broadcast file servers (such as broadcast server 1 and broadcast server 2) and other content servers may deliver content to one or more switches, routers, or other network nodes for delivery in accordance with the SMS's mapping. In the example of FIG. 6, a requested content is sent from the transmission center over the wireless access network to a receiver, such as for example an Advanced Television Systems Committee (ATSC) receiver in a broadcast network. The receiver may be coupled to a user equipment, such as for example a computer or a mobile phone as shown in FIG. 6, where the content may be consumed (e.g., displayed or otherwise processed) by an end user. The transmission center uses at least a portion of the spectrum that the SMS allocated for the requested content in transmitting the content to the receiver.

As noted above, in some embodiments, such as depicted in FIG. 6, Openflow switch(es) 605 may be used to create virtual vertical network slices between a content server and one or more end users. In such exemplary implementations, different content may be served using different data streams, such that the switch 605 may adjust the data rate, channel coding, modulation, transmission scheduling, prioritization, and/or other QoS parameters for transmitting each stream using the spectrum allocated by the SMS, for example, to optimize revenues and/or bandwidth usage as permitted by SLA(s) governing the delivery of the content in the network.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein. In accordance with additional embodiments of the present disclosure, a computer-readable medium is disclosed that stores instructions that, when executed by a processor(s), causes the processor(s) to perform operations consistent with one or more disclosed methods.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A method for allocating spectrum in a wireless access network, the method comprising:
   receiving a content service request for delivery of a content over the wireless access network;
   allocating spectrum for serving the requested content in the wireless access network, wherein frequency channels or blocks of the spectrum are optimized and allocated by a spectrum management service (SMS) in a spectrum allocation system based on at least one radio-frequency (RF) criterion, at least one criterion relating to the content and at least one criterion relating to resource and capacity availability, wherein the RF criterion comprises a RF signal propagation constraint related to at least one of terrain or topography, wherein the criterion relating to the content is determined based at least in part on an input received from a source in the wireless access network, wherein the criterion relating to resource and capacity availability in the wireless access network may comprise at least one of a resource ID, a resource owner, a resource type, a resource bandwidth, a resource availability start and end time, physical layer resources or a resource coverage; and
   issuing a message to a transmission center, the message indicating allocated spectrum that may be used to serve the content in the wireless access network, wherein the transmission center serves the requested content in the wireless access network.

2. The method of claim 1, wherein the criterion relating to the content further comprises one or more of a type of content being requested, a quality of service with which the requested content needs to be served, revenue generated for owners of resources used to serve the requested content, or immediacy for delivering the requested content.

3. The method of claim 1, wherein allocating spectrum for serving the content further comprises allocating available spectrum from a pool of spectrum resources, the spectrum resources including at least one frequency channel or block of frequency channels.

4. The method of claim 3, wherein the spectrum resources comprises non-contiguous spectrum resources.

5. The method of claim 1, wherein the transmission center is the source.

6. The method of claim 1, wherein the SMS is a cloud-based service in communication with a virtualized SMS function in the transmission center.

7. The method of claim 1, wherein the RF criterion further comprises a criterion based on acceptable interference levels in the wireless access network.

8. The method of claim 1, wherein allocating spectrum for serving the requested content further comprises allocating spectrum to optimize a mapping content to available spectrum resources and infrastructure resources.

9. The method of claim 8, further comprising using machine-learning based algorithms to optimize the mapping of content to available spectrum resources.

10. A non-transitory computer-readable medium comprising computer-readable instructions for execution by a processor of a spectrum management service (SMS) that performs a method for allocating spectrum in a wireless access network, the method comprising:
    receiving a content service request for delivery of a content over the wireless access network;
    allocating spectrum for serving the requested content in the wireless access network, wherein frequency channels or blocks of the spectrum are optimized and allocated by a spectrum management service (SMS) in a spectrum allocation system based on at least one radio-frequency (RF) criterion, at least one criterion relating to the content and at least one criterion relating to resource and capacity availability, wherein the RF criterion comprises a RF signal propagation constraint related to at least one of terrain or topography, wherein the criterion relating to the content is determined based at least in part on an input received from a source in the wireless access network, wherein the criterion relating to resource and capacity availability in the wireless access network may comprise at least one of a resource ID, a resource owner, a resource type, a resource bandwidth, a resource availability start and end time, physical layer resources or a resource coverage; and
    issuing a message to a transmission center, the message indicating allocated spectrum that may be used to serve the content in the wireless access network, wherein the transmission center serves the requested content in the wireless access network.

11. The non-transitory computer-readable medium of claim 10, wherein the criterion relating to the content further comprises one or more of a type of content being requested, a quality of service with which the requested content needs to be served, revenue generated for owners of resources used to serve the requested content, or immediacy for delivering the requested content.

12. The non-transitory computer-readable medium of claim 10, further comprising computer-readable instructions, which when executed by the processor, cause the processor to allocate spectrum from a pool of spectrum resources, the spectrum resources including at least one frequency channel or block of frequency channels.

13. The non-transitory computer-readable medium of claim 10, wherein the SMS is a cloud-based service in communication with a virtualized SMS function in the transmission center.

14. The non-transitory computer-readable medium of claim 10, further comprising computer-readable instructions, which when executed by the processor, cause the processor to allocate spectrum to optimize a mapping content to available spectrum resources.

15. A spectrum allocation system for allocating spectrum in a wireless access network, the system comprising:
   at least one network interface configured to communicate with a transmission center in the wireless access network;
   a processor;
   at least one memory storing instructions for execution by the processor, wherein the instructions, when executed, implement a spectrum management service (SMS) that is configured to:
   receive a content service request for delivery of a content over the wireless access network;
   allocate spectrum for serving the requested content in the wireless access network, wherein frequency channels or blocks of the spectrum are optimized and allocated by a spectrum management service (SMS) in a spectrum allocation system based on at least one radio-frequency (RF) criterion, at least one criterion relating to the content and at least one criterion relating to resource and capacity availability, wherein the RF criterion comprises a RF signal propagation constraint related to at least one of terrain or topography, wherein the criterion relating to the content is determined based at least in part on an input received from a source in the wireless access network, wherein the criterion relating to resource and capacity availability in the wireless access network may comprise at least one of a resource ID, a resource owner, a resource type, a resource bandwidth, a resource availability start and end time, physical layer resources or a resource coverage; and
   issue a message to a transmission center, the message indicating allocated spectrum that may be used to serve the content in the wireless access network, wherein the transmission center serves the requested content in the wireless access network.

16. The spectrum allocation system of claim 15, wherein the criterion relating to the content further comprises one or more of a type of content being requested, a quality of service with which the requested content needs to be served, revenue generated for owners of resources used to serve the requested content, or immediacy for delivering the requested content.

17. The spectrum allocation system of claim 15, wherein the SMS is further configured to allocate spectrum from a pool of spectrum resources, the spectrum resources including at least one frequency channel or block of frequency channels.

18. The spectrum allocation system of claim 15, wherein the SMS is a cloud-based service in the spectrum allocation system and is in communication with a virtualized SMS function in the transmission center.

19. The spectrum allocation system of claim 15, wherein the SMS is further configured to allocate spectrum to optimize a mapping content to available spectrum resources.

* * * * *